(12) United States Patent
Lohrentz

(10) Patent No.: US 6,415,590 B1
(45) Date of Patent: Jul. 9, 2002

(54) DOUBLE WINDROW ATTACHMENT LIFT MECHANISM FOR HARVESTERS

(75) Inventor: Randy Lohrentz, Buhler, KS (US)

(73) Assignee: Agco Corporation, Duluth, GA (US)

( * ) Notice: Subject to any disclaimer, the term of this patent is extended or adjusted under 35 U.S.C. 154(b) by 0 day.

(21) Appl. No.: 09/642,423

(22) Filed: Aug. 21, 2000

(51) Int. Cl.$^7$ ............................................. A01D 43/00
(52) U.S. Cl. ........................................ 56/192; 56/14.9
(58) Field of Search ...................... 56/378, 14.5, 14.9, 56/16.4 R, DIG. 21, 193, 192, 15.5, 15.9, 10.7, 10.6, 10.8, 11.9

(56) References Cited

U.S. PATENT DOCUMENTS

| | | |
|---|---|---|
| 2,761,270 A | 9/1956 | Blaser et al. |
| 3,059,403 A | 10/1962 | Bamford et al. |
| 3,221,484 A | 12/1965 | Van Der Lely |
| 3,383,844 A | 5/1968 | Glass et al. |
| 3,523,410 A | 8/1970 | Taylor et al. |
| 3,911,649 A | 10/1975 | Scarnato et al. |
| 3,928,955 A | 12/1975 | Case |
| 3,976,143 A | 8/1976 | Rodger |
| 4,022,005 A | 5/1977 | Case |
| 4,274,247 A | 6/1981 | Schmidt et al. |
| 4,590,751 A * | 5/1986 | Stephenson .................. 56/192 |
| 4,809,490 A | 3/1989 | Swanson |
| 4,910,951 A | 3/1990 | Reilly et al. |
| 4,991,383 A * | 2/1991 | Ermarcora .................. 56/14.9 |
| 6,062,010 A * | 5/2000 | Kraus et al. ............. 56/16.4 R |

FOREIGN PATENT DOCUMENTS

EP          0406766 A1 *  1/1991

OTHER PUBLICATIONS

Agco Hesston Opertor's Manual Double Windrow Attachment for 8400 Windrower Tractor; Copyright 1993, cover page, p. 2/97, pp. 4, 9, 10, 11, 12, 14, 18 and back page.

Agco Hesston 8400 Double Windrow Attachment Parts Catalog, Dec. 1993, cover page, table of contents, and pp. 2–1, 2–2, 2–3, 2–4, 2–5, 2–6 and 2–7.

Assembly Instructions Double Windrow Attachment for 8400 Windrower Tractor, Mar. 17, 1993, pp. 1, 15, and 16.

* cited by examiner

Primary Examiner—Thomas B. Will
Assistant Examiner—Meredith C. Petravick
(74) Attorney, Agent, or Firm—Hovey Williams LLP

(57) ABSTRACT

A hay harvester has a double windrow cross-conveyor supported rearwardly of the harvesting header to receive a stream of conditioned crop materials from the header and transport the same laterally to an outboard position. A deflector adjacent the discharge end of the conveyor is maintained in a lowered position to direct materials to the ground to form a first windrow during a first pass and is then placed in a raised position during a return pass so as to allow the stream discharging from the cross-conveyor to be deposited close to the first windrow, thus forming a double windrow. The cross-conveyor is hingedly affixed to the vehicle in such a manner that the normally tilted down, lower front edge of the cross-conveyor can be raised up into a transport position for higher ground clearance or to switch to single swathing. The header and cross-conveyor are preferably plumbed in a parallel fluid flow relationship so that they are raised or lowered simultaneously.

23 Claims, 4 Drawing Sheets

US 6,415,590 B1

DOUBLE WINDROW ATTACHMENT LIFT MECHANISM FOR HARVESTERS

TECHNICAL FIELD

The present invention relates to harvesters, and, more particularly, to hay harvesting equipment of the type that is capable of producing a pair of windrows (double windrows) on top of one another, side-by-side, or merged into one large windrow so that subsequent, high capacity equipment such as big square balers and self-propelled forage harvesters have double the amount of windrowed material to ingest during each pass across a field.

BACKGROUND

Conventional double windrow attachments for either self-propelled or pull-type windrowers utilize an obliquely oriented cross-conveyor behind the header of the machine for receiving a stream of crop materials from the conditioning apparatus of the header. Rather than allowing the materials to fall to the ground directly behind the header, the cross-conveyor transports the materials to a remote outboard location. In a first pass, a deflector at the discharge end of the conveyor directs the materials down to the ground to form a first windrow. Then, in the next pass, the deflector is maintained in a raised position so that the discharging materials pass beneath the deflector and are projected further outboard than in the first pass, causing a second windrow to be laid down essentially along side of the first windrow.

The obliquely disposed cross-conveyor in conventional equipment is tilted down along its front edge so that the cross-conveyor intercepts the entire material stream in mid-flight as it issues from the conditioner. The front edge thus operates close to the ground, which presents ground clearance problems when the machine is being transported over rough terrain, over terraces or onto trailers.

SUMMARY OF THE INVENTION

The present invention overcomes the problems of the prior art through the provision of a cross-conveyor that can be raised and lowered as may be necessary or desirable to increase or decrease ground clearance. In a preferred form, the cross-conveyor is pivoted or hinged to the supporting frame of the machine in such a manner that the cross-conveyor swings up and down about a transverse axis along the rear edge of the conveyor between a lowered downwardly tilted position and a raised, generally horizontally disposed position. Preferably, the cross-conveyor utilizes a lift cylinder to effectuate its raising and lowering movement, and such lift cylinder is hydraulically integrated in a flow circuit with lift cylinders for the header in such a manner that both the header and cross-conveyor are raised or lowered at the same time.

BRIEF DESCRIPTION OF THE DRAWINGS

FIG. 4 is an enlarged, front elevational detail view of the discharge deflector illustrating raised and lowered positions thereof.

DETAILED DESCRIPTION

Figure 1:
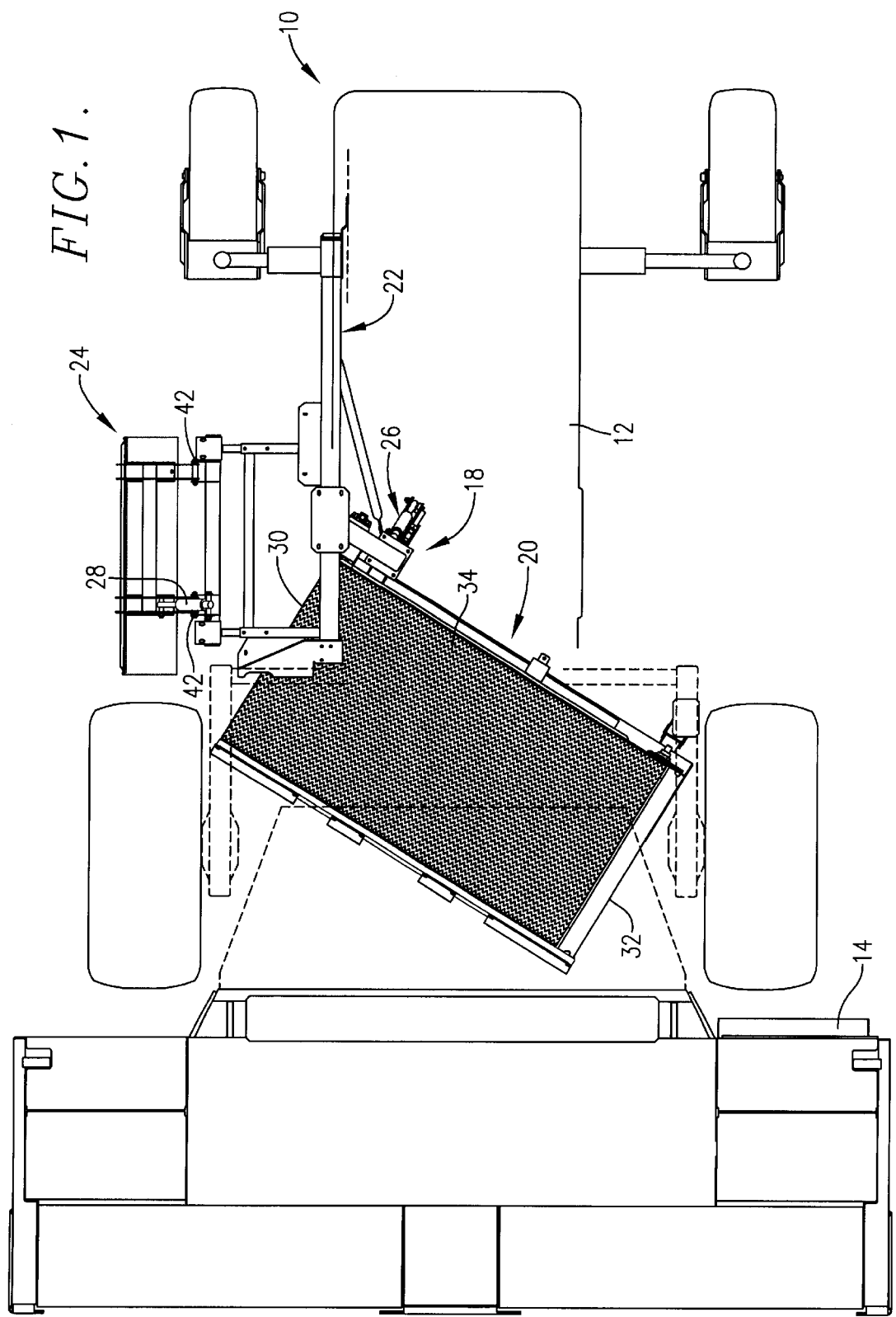
FIG. 1 is a schematic, top plan view of a self-propelled harvester incorporating the present invention.

Although the present invention has been illustrated and will be described in connection with a self-propelled windrower, it will be appreciated by those skilled in the art that the principles of this invention may also be utilized in a pull-type machine.

The harvester 10 in the illustrated embodiment includes a self-propelled tractor 12 and a header 14 attached to the front end of the tractor 12. As well understood by those skilled in the art, header 14 is mounted on tractor 12 for up and down swinging movement between a raised, transport position in FIG. 2 and a lowered, working position in FIG. 3. A header lift cylinder 16 shown in FIGS. 2 and 3 comprises one of two of such cylinders, which will be described in more detail below in connection with the hydraulic circuit of the machine.

Broadly speaking, the header 14, as well understood by those skilled in the art, is operable when lowered to sever standing crop materials as the harvester moves through the field, to condition such materials by passing them between conditioning rolls or impacting them with a flail rotor or the like, and to project the severed materials rearwardly in a stream beneath the tractor 12. Although it is not essential that the severed materials be conditioned by the header 14, as a practical matter in most cases such conditioning is preferred and is a standard practice in the industry where self-propelled windrowers are involved.

A double windrow attachment is denoted by the numeral 18 and broadly includes a cross-conveyor 20, a frame 22 for securing the cross-conveyor 20 to tractor 12, a deflector 24 supported by frame 22 adjacent the discharge end of cross-conveyor 20, a lift cylinder 26 for raising and lowering cross-conveyor 20 relative to tractor 12, and an operating cylinder 28 for raising and lowering deflector 24. Conveyor 20 is generally rectangular as viewed in top plan as in FIG. 1 and is mounted in an oblique orientation with respect to the path of travel of harvester 10, the discharge end 30 of cross-conveyor 20 being located somewhat behind the opposite leading end 32 thereof. A continuous, flat platform belt 34 of conveyor 20 has a wide top surface for receiving crop materials from header 14 and supporting them as they are conveyed toward discharge end 30.

Figure 2:
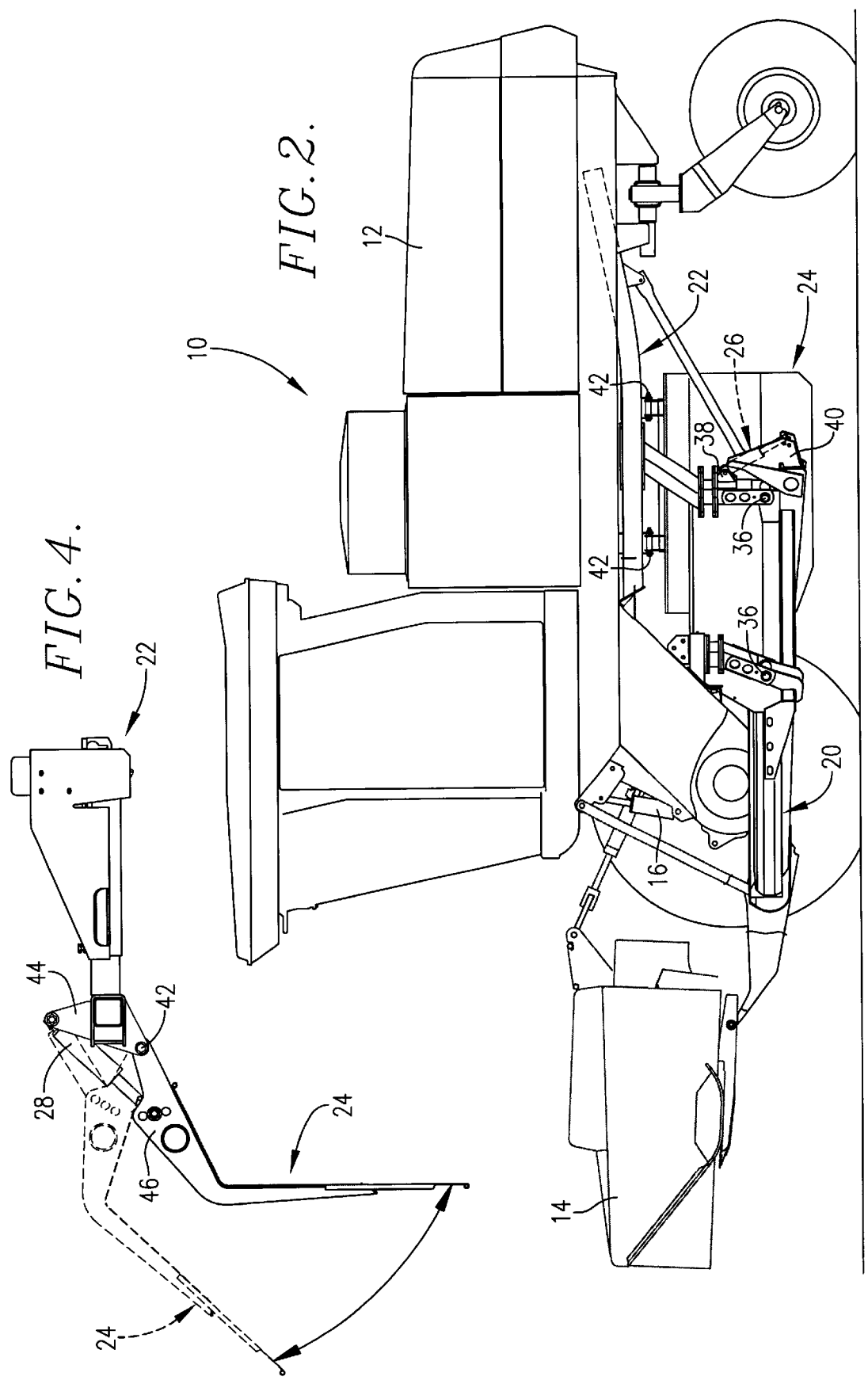
FIG. 2 is a schematic side elevational view thereof showing the header and cross-conveyor raised.
Figure 3:
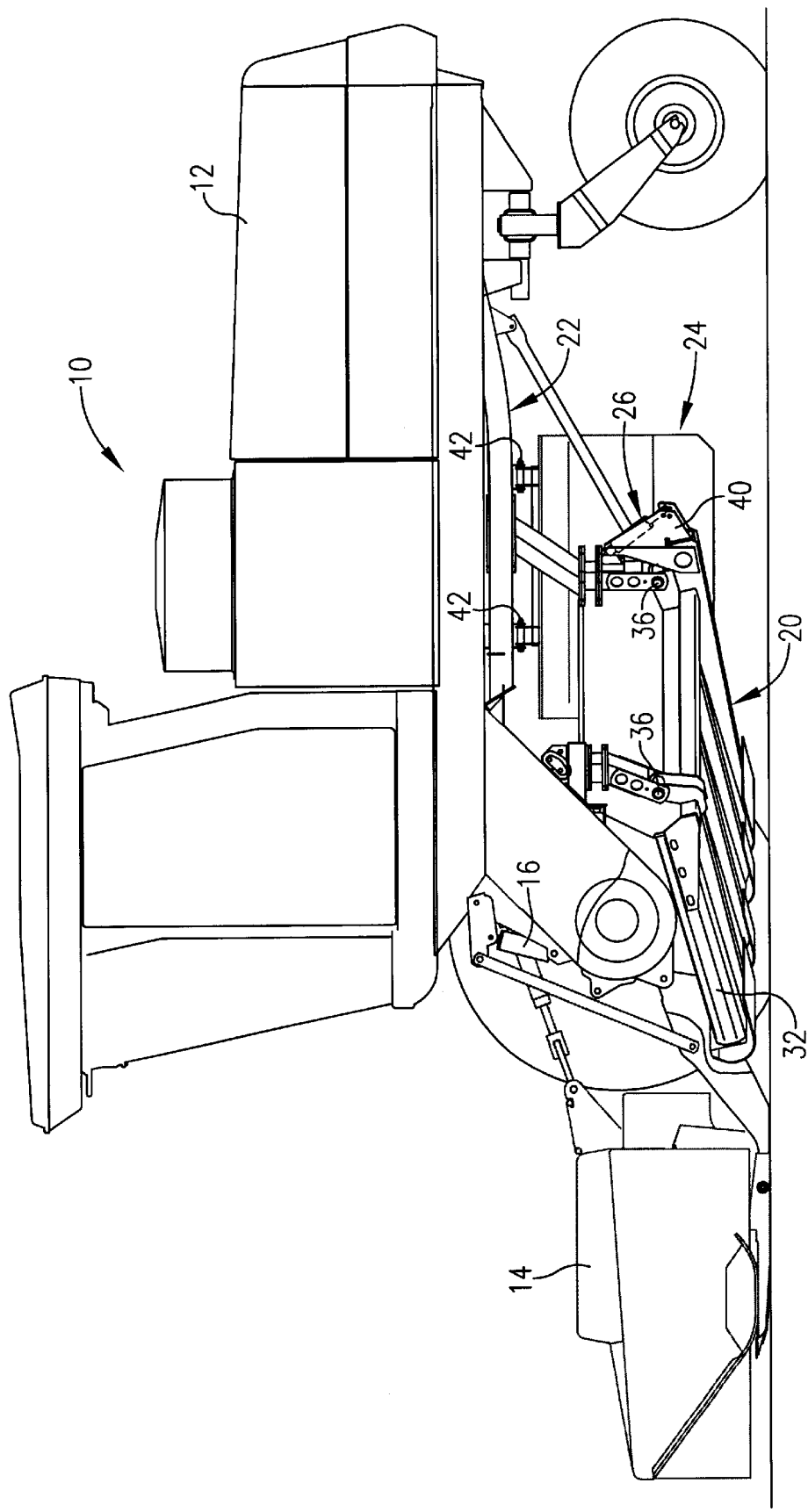
FIG. 3 is a schematic side elevational view similar to FIG. 2 but showing the header and cross-conveyor lowered.

Cross-conveyor 20 is secured to frame 22 by a pair of aligned pivots 36 (FIGS. 2 and 3) that permit cross-conveyor 20 to be swung up and down in a hinging motion between a raised, horizontal transport position of FIG. 2 and a lowered, downwardly and forwardly inclined, operating position of FIG. 3. Lift cylinder 26 for cross-conveyor 20 is connected between a rearwardly extending lug 38 (FIG. 2) on frame 22 and a crank member 40 on cross-conveyor 20 for effecting powered raising and lowering of cross-conveyor 20.

Figure 5:
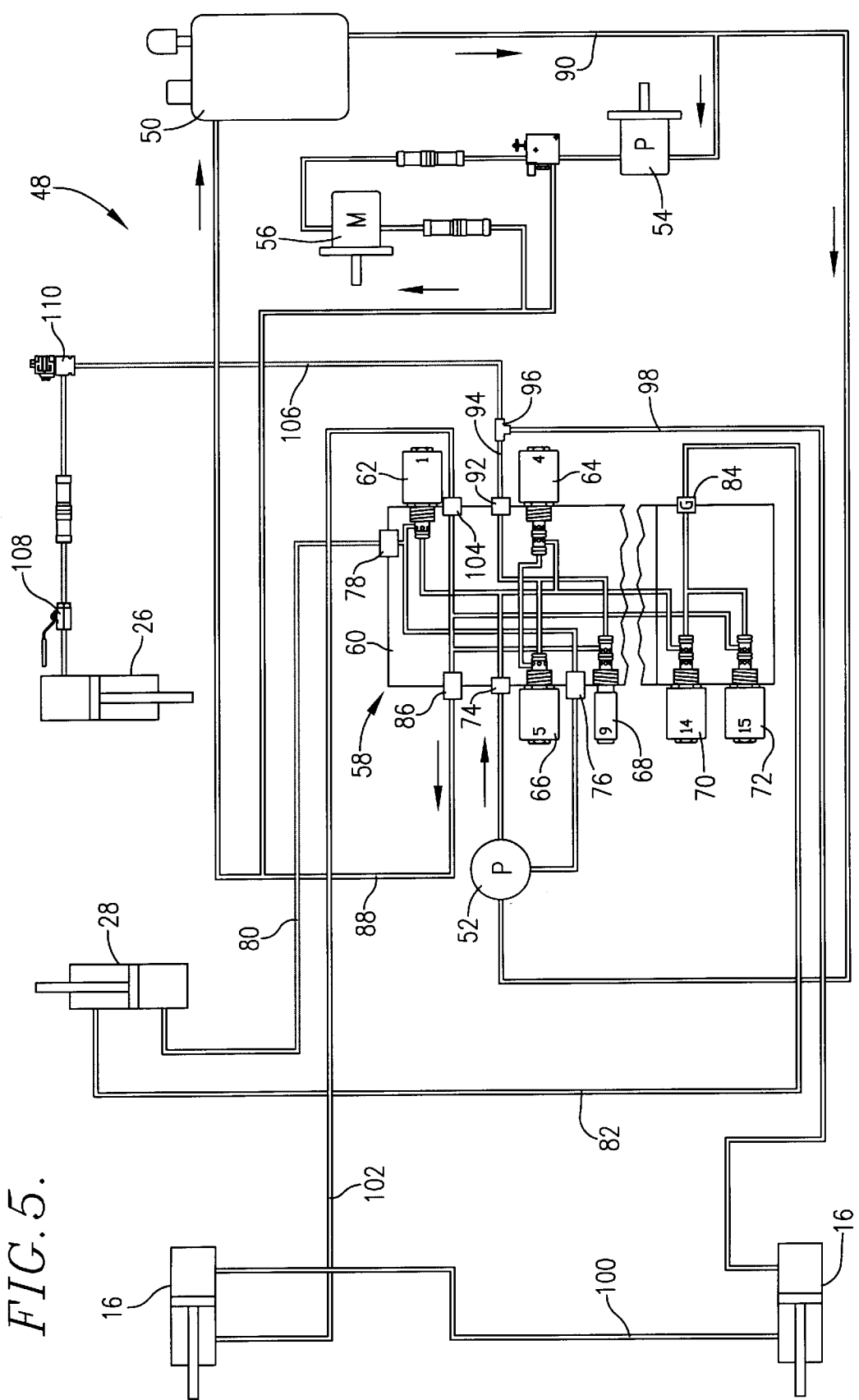
FIG. 5 is a hydraulic flow diagram of a circuit associated with the windrower and capable of raising or lowering the header and cross-conveyor simultaneously.

The deflector 24 is located laterally outboard of the discharge end 30 of cross-conveyor 20 in generally parallel relationship with the path of travel of harvester 10. Deflector 24 is swingably connected to frame 22 by a pair of aligned, fore-and-aft pivots 42 for movement between raised and lowered positions illustrated in FIG. 4. Deflector lift cylinder 28 is connected between an upstanding lug 44 on frame 22 and an ear 46 on deflector 24. FIG. 5 is a simplified illustration of a suitable hydraulic circuit 48 of the harvester 10. Except with respect to the way in which the conveyor lift cylinder 26 and header lift cylinders 16 are related to one another within circuit 48, the circuit of the windrower is largely conventional and will not, therefore, be described in detail. For the sake of simplicity and ease of understanding, several components normally found within such a circuit have been left off including, for example, ground drive motors for tractor 12, header drive motors, header flotation cylinders, and a header angle tilt cylinder.

Suffice it to point out, therefore, that a reservoir 50 supplies hydraulic fluid to the various operating components of circuit 48, including a main pump 52 driven by the engine (not shown) of tractor 12. Reservoir 50 also supplies oil to a second pump 54 that is belt-driven off the engine. Pump 54 is primarily responsible for supplying pressurized oil to a hydraulic motor 56 that drives platform belt 34 of conveyor 20. On the other hand, pump 52 is primarily responsible for supplying pressurized oil to header lift cylinders 16, cross-conveyor lift cylinder 26, and deflector operating cylinder 28.

Pressurized fluid to cylinders 16, 26 and 28 is controlled by a bank of valves 58 situated between those cylinders and the pump 52. Among other things, the bank of valves 58 includes a valve block 60 and a plurality of associated solenoid-controlled valves 62, 64, 66, 68, 70 and 72. Pressurized fluid from pump 52 enters block 60 via ports 74 and 76 and thence moves through various internal passages controlled by valves 62-72. An outlet port 78 supplies pressurized oil to deflector operating cylinder 28 via line 80, and a return line 82 from deflector operating cylinder 28 reconnects with block 60 at a return port 84. An outlet port 86 communicates with the reservoir 50 via a return line 88, and a line 90 communicates the reservoir 50 with the pump 52.

An outlet port 92 supplies pressurized fluid to the header lift cylinders 16 via a line 94, a Tee connection 96, and a line 98 leading from Tee connection 96. Header lift cylinders 16 are connected in a master slave relationship via an interconnect line 100 such that pressurized fluid from the rod end of one cylinder 16 communicates with the base end of the other cylinder 16. A return line 102 leads from the rod end of the slave cylinder to a return port 104 in block 60, and thence to return line 88 via outlet port 86.

The Tee connection 96 has, in addition to the line 98 to header lift cylinder 16, a supply line 106 leading therefrom to the conveyor lift cylinder 26. Thus, header lift cylinders 16 and conveyor lift cylinder 26 are connected in a parallel fluid flow relationship via Tee connection 96 such that both receive pressurized oil simultaneously when outlet port 92 is activated by the internal valving of block 60. Conveyor lift cylinder 26 is a single acting cylinder which is extended under hydraulic pressure and retracted by gravity. More specifically, conveyor lift cylinder 26 is connected mechanically to cross-conveyor 20 in such a way that cylinder 26 is extended to raise cross-conveyor 20 but then is retracted by the weight of conveyor 20 so as to allow conveyor 20 to move down to its lowered position.

A manual lock-out valve 108 is provided in line 106 for the purpose of allowing the operator to lock cylinder 26 in any degree of partial or full extension. This provides a safety function in the event the operator may need to perform a maintenance operation below the conveyor. This lock-out also permits the operator to lock the conveyor in the down position yet hydraulically raise the header either partially or fully while operating in the field.

An electrically actuated solenoid valve 110, operable from the tractor cab, may be provided in supply line 106 to permit the operator to remotely lock the conveyor in the up position when the conveyor is turned off. The same switch (not shown) for turning the conveyor off and on also locks and unlocks the solenoid valve 110. When the conveyor is locked up and turned off, a swath may be passed below the conveyor from the header 14. This allows the operator to switch from double windrowing to single swathing without leaving the tractor cab.

Operation

In use, harvester 10 is normally operated with header 14 and cross-conveyor 20 in their lowered operating positions of FIG. 3. In this condition, severed crop materials issue from header 14 in an air-borne stream and are projected rearwardly beneath tractor 12 until landing upon the cross-conveyor 20 whose belt 34 is moving in a rightward direction as harvester 10 is viewed from the rear. Cross-conveyor 20 intercepts the stream of materials so they never reach the ground under tractor 12. Instead, the received materials are immediately transported toward the right side of tractor 12 by conveyor 34, which is continuously operating.

During a first pass of the two passes necessary to create each double windrow, deflector 24 is maintained in its lowered position as illustrated in FIGS. 1–3. Thus, as the materials are flung off discharge end 30 of cross-conveyor 20, they strike deflector 24 and are immediately directed straight down to the ground behind the right front wheel of tractor 12. This creates a first windrow beside standing crop on the right side of the harvester.

As harvester 10 reaches the end of the first pass and arrives in the headland area of the field, the operator normally raises header 14 to facilitate making a 180° degree turn for the commencement of the second or return pass of the double windrow forming cycle. Due to the parallel fluid flow relationship of the conveyor lift cylinder 26 and the header lift cylinders 16, cross-conveyor 20 hinges up to its raised position simultaneously with header 14 as it is raised at this time.

As the harvester 10 starts back along its second pass, standing crop material will be located at the left side of the machine, as well as in front of header 14. Once header 14 and cross-conveyor 20 have been re-lowered to the ground and cutting has recommenced, header 14 and cross-conveyor 20 perform in the usual way, except that, now, deflector 24 is raised to the phantom line position of FIG. 4. With deflector 24 thus elevated, the stream of materials issuing from the discharge end 30 of cross-conveyor 20 passes under deflector 24 to a much further outboard position than with the first windrow. Preferably, the stream of materials reach the ground near or slightly beyond the outboard end of header 14 so as to form a second windrow that is in close proximity to the first-formed windrow. Once the second pass is completed, the harvester turns around in the previously described manner to commence the first run of another double windrow cycle, the header 14 and cross-conveyor 20 being raised or lowered simultaneously as previously described. Deflector 24 is returned to its lowered position so as to direct the materials into a first windrow located inboard of the outboard end of header 14 so as to not co-mingle with standing crop on the right side of the machine.

In its lowered position, the cross-conveyor 20 has its front edge tilted down close to the ground so as to assure that all materials issuing from the header 14 are fully captured on the belt 34. On the other hand, in order to clear significant obstructions on the ground in the transport position, a relatively large amount of vertical movement of the front edge is necessary. By hinging the conveyor 20 to the tractor 12 adjacent the rear edge of conveyor 20, a more than ample amount of ground clearance can be obtained at the front of the conveyor with only a relatively short stroke of the lift cylinder 26.

It will be appreciated that at certain times and under certain conditions the operator may wish to use the harvester 10 to produce a single swath directly behind header 14 along the longitudinal center line of the machine. This can be readily achieved by simply raising header 14 and cross-conveyor 20 to their transport positions and then actuating the appropriate switch to turn off the conveyor and close solenoid valve 110 to lock the conveyor in the up position. Header 14 may then be lowered back to the ground to perform its operations in the usual manner with the crop stream passing rearwardly beneath the elevated cross-conveyor 20.

The preferred forms of the invention described above are to be used as illustration only, and should not be utilized in a limiting sense in interpreting the scope of the present invention. Obvious modifications to the exemplary embodiments, as herein above set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. In a harvester, the improvement comprising:

a mobile vehicle;

a harvesting header mounted on said vehicle for movement between raised and lowered positions relative to the vehicle, said header being operable to sever crop materials from the ground and to project the severed materials rearwardly in a stream;

a double-windrow cross-conveyor mounted on said vehicle behind the header in position for receiving the stream of severed materials from the header, said cross-conveyor being disposed to convey the severed materials generally laterally of the path of travel of the vehicle and having a discharge end disposed to discharge the severed materials outboard of the longitudinal center line of the harvester, said cross-conveyor being mounted for movement between raised and lowered positions relative to the vehicle; and a lift mechanism operably coupled with the header and the cross-conveyor and operable to raise or lower both the header and cross-conveyor at the same time, said lift mechanism being operable to permit said cross-conveyor to be selectively retained in its raised position while the header is being operated in its lowered position or moved between its raised and lowered positions.

2. In a harvester as claimed in claim 1, said lift mechanism including a header lift cylinder connected between the vehicle and the header and a cross-conveyor lift cylinder connected between the vehicle and the cross-conveyor, said lift mechanism further including a hydraulic flow circuit in which the header lift cylinder and the cross-conveyor lift cylinder are connected in parallel fluid flow relationship to one another.

3. In a harvester as claimed in claim 2, said hydraulic flow circuit including valving selectively operable to isolate the cross-conveyor lift cylinder from the header lift cylinder whereby to permit the cross-conveyor to be maintained in a raised position while the header is raised and lowered by the header lift cylinder.

4. In a harvester as claimed in claim 1, said vehicle comprising a self-propelled tractor.

5. In a harvester as claimed in claim 1, said cross-conveyor when in said lowered position being downwardly and forwardly inclined such that a front, transversely extending edge of the cross-conveyor is lower than a rear transversely extending edge thereof, said cross-conveyor when in said raised position being substantially level such that the front and rear edges are disposed at least generally at the same height, said cross-conveyor being hingedly attached to the vehicle generally along said rear edge thereof such that said front edge of the cross-conveyor moves up and down relative to said rear edge during raising and lowering of the cross-conveyor.

6. In a harvester as claimed in claim 1, said lift mechanism including separate power devices for the header and the cross-conveyor.

7. In a harvester as claimed in claim 6, said power devices comprising hydraulic cylinders.

8. In a harvester as claimed in claim 7, said cylinders being connected in parallel fluid flow relationship, said cylinder for the cross-conveyor being controlled by valving selectively operable to isolate the cross-conveyor cylinder from the cylinder for the header whereby to permit said retention of the cross-conveyor in its raised position while the header is being raised or lowered.

9. In a harvester as claimed in claim 1, further comprising a deflector adjacent said discharge end of the cross-conveyor operable to cause the discharging materials to become deposited on the ground at either selected one of a pair of different outboard locations.

10. In a harvester, the improvement comprising:

a mobile vehicle;

a harvesting header mounted on said vehicle, said header being operable to sever crop materials from the ground and to project the severed materials rearwardly in a stream;

a double-windrow cross-conveyor mounted on said vehicle behind the header in position for receiving the stream of severed materials from the header, said cross-conveyor being disposed to convey the severed materials generally laterally of the path of travel of the vehicle and having a discharge end disposed to discharge the severed materials outboard of the longitudinal center line of the harvester, said cross-conveyor being mounted for movement between a lowered position wherein the cross-conveyor is downwardly and forwardly inclined such that a front, transversely extending edge of the cross-conveyor is lower than a rear, transversely extending edge thereof and a raised position wherein the cross-conveyor is substantially level such that the front and rear edges are disposed at least generally at the same height, said cross-conveyor being hingedly attached to the vehicle generally along said rear edge of the cross-conveyor such that said front edge of the cross-conveyor moves up and down relative to said rear edge during raising and lowering of the cross-conveyor; and a lift mechanism operably coupled with the cross-conveyor for effecting said raising and lowering thereof.

11. In a harvester as claimed in claim 10, said header being mounted for movement between raised and lowered positions, said lift mechanism being operable to raise or lower both the cross-conveyor and the header at the same time.

12. In a harvester as claimed in claim 11, said lift mechanism including a header lift cylinder connected between the vehicle and the header and a cross-conveyor lift cylinder connected between the vehicle and the cross-conveyor, said lift mechanism further including a hydraulic flow circuit in which the header lift cylinder and the cross-conveyor lift cylinder are connected in parallel fluid flow relationship to one another.

13. In a harvester as claimed in claim 12, said hydraulic flow circuit including valving selectively operable to isolate the cross-conveyor lift cylinder from the header lift cylinder whereby to permit the cross-conveyor to be maintained in a raised position while the header is raised and lowered by the header lift cylinder.

14. In a harvester as claimed in claim 10, said vehicle comprising a self-propelled tractor.

15. In a harvester as claimed in claim 10, further comprising a deflector adjacent said discharge end of the cross-conveyor operable to cause the discharging materials to become deposited on the ground at either selected one of a pair of different outboard locations.

16. In a harvester, the improvement comprising:

a mobile vehicle;

a harvesting header mounted on the front of said vehicle for severing crop materials from the ground and projecting the severed materials rearwardly in a stream as the vehicle moves across a field of standing crop, said header being mounted for movement between raised and lowered positions relative to the vehicle;

a cross-conveyor mounted on said vehicle behind the header, said cross-conveyor being selectively movable between lowered and raised positions relative to the vehicle, said cross-conveyor being operable when in said lowered position to receive a stream of severed materials from the header and to convey the materials laterally of the path of travel of the vehicle to a point of discharge outboard of the longitudinal center line of the harvester; and a lift mechanism operably coupled with the header and the cross-conveyor, said lift mechanism being operable to permit said cross-conveyor to be selectively retained in its raised position while the header is being operated in its lowered position or moved between its raised and lowered positions.

17. In a harvester as claimed in claim 16, said cross-conveyor having a remotely actuatable hydraulic lift cylinder operably coupled therewith for moving the cross-conveyor to said raised position, said cross-conveyor lift cylinder having a remotely actuatable valve operably associated therewith that is selectively operable to maintain the cross-conveyor lift cylinder in a condition retaining the cross-conveyor in said raised position.

18. In a harvester as claimed in claim 17, said vehicle comprising a self-propelled tractor having a driver's seat, said cross-conveyor lift cylinder and said valve being operable from said driver's seat.

19. In a harvester as claimed in claim 17, said header having a lift cylinder operably coupled therewith for raising and lowering the header relative to the vehicle, said header lift cylinder and said cross-conveyor lift cylinder being connected in parallel fluid flow relationship to one another for raising or lowering both the header and the cross-conveyor simultaneously.

20. In a harvester as claimed in claim 19, said valve being selectively operable to isolate the cross-conveyor lift cylinder from the header lift cylinder whereby to permit the cross-conveyor to be maintained in said raised position while the header is raised and lowered by the header lift cylinder.

21. In a harvester as claimed in claim 16, said vehicle comprising a self-propelled tractor.

22. In a harvester as claimed in claim 16, said cross-conveyor when in said lowered position being downwardly and forwardly inclined such that a front, transversely extending edge of the cross-conveyor is lower than a rear transversely extending edge thereof, said cross-conveyor when in said raised position being substantially level such that the front and rear edges are disposed at least generally at the same height, said cross-conveyor being hingedly attached to the vehicle generally along said rear edge thereof such that said front edge of the cross-conveyor moves up and down relative to said rear edge during raising and lowering of the cross-conveyor.

23. In a harvester as claimed in claim 16, further comprising a deflector adjacent the outboard end of the cross-conveyor selectively operable to cause materials discharging from the cross-conveyor to fall to ground at either selected one of a pair of different outboard positions.

* * * * *